US00RE46016E

(19) United States
(12) Reissued Patent
Scherbing

(10) Patent Number: US RE46,016 E
(45) Date of Reissued Patent: May 31, 2016

(54) INCUBATOR HOUSING

(71) Applicant: Miller Manufacturing Company, Eagan, MN (US)

(72) Inventor: Gerald Scherbing, Minneapolis, MN (US)

(73) Assignee: Miller Manufacturing Company, Eagan, MN (US)

(21) Appl. No.: 29/474,585

(22) Filed: Oct. 9, 2014

Related U.S. Patent Documents

Reissue of:
(64) Patent No.: Des. 707,823
Issued: Jun. 24, 2014
Appl. No.: 29/451,204
Filed: Mar. 28, 2013

(51) LOC (10) Cl. ..... 24-01
(52) U.S. Cl.
USPC ..... D24/163; D30/199
(58) Field of Classification Search
USPC ..... D24/163, 164, 185, 202, 209, 231; 600/21, 22; 119/311, 315, 317; 128/202.12, 205.26; D30/108, 117, D30/199, 109, 119
CPC ..... A01K 41/00; A01K 41/023; A01K 41/06
See application file for complete search history.

(56) References Cited

U.S. PATENT DOCUMENTS

D250,355 S * 11/1978 Marsh ..... D30/117
4,966,973 A * 10/1990 Goto et al. ..... 119/311

(Continued)

FOREIGN PATENT DOCUMENTS

CN 103309370 A 9/2013
WO WO2005013678 A2 2/2005

OTHER PUBLICATIONS

Miller Manufacturing Company, "Automatic Egg Turner" Advertisement, Aug. 2007, 1 page.

(Continued)

*Primary Examiner* — Phillip S Hyder
(74) *Attorney, Agent, or Firm* — Briggs and Morgan, P.A.

(57) CLAIM

The ornamental design for an incubator housing, as shown.

DESCRIPTION

FIG. 1 is a perspective view of an outside of the incubator housing.
FIG. 2 is a perspective view of an inside of the incubator housing of FIG. 1.
FIG. 3 is an inside view of the incubator housing of FIG. 1.
FIG. 4 is an outside view of the incubator housing of FIG. 1.
FIG. 5 is a [side] *top* view of the outside of the incubator housing of FIG. 1; [and,]
FIG. 6 is [another] side view of the outside of the incubator housing of FIG. 1[.];
*FIG. 7 is a perspective view of an outside of a second embodiment of the incubator housing;*
*FIG. 8 is a perspective view of an inside of the incubator housing of FIG. 7;*
*FIG. 9 is an inside view of the incubator housing of FIG. 7;*
*FIG. 10 is an outside view of the incubator housing of FIG. 7;*
*FIG. 11 is a top view of the outside of the incubator housing of FIG. 7; and,*
*FIG. 12 is a side view of the outside of the incubator housing of FIG. 7.*
*The portions of the drawings in broken lines are shown for illustrative purposes only and form no part of the claimed design.*

1 Claim, 10 Drawing Sheets

Figure 1:
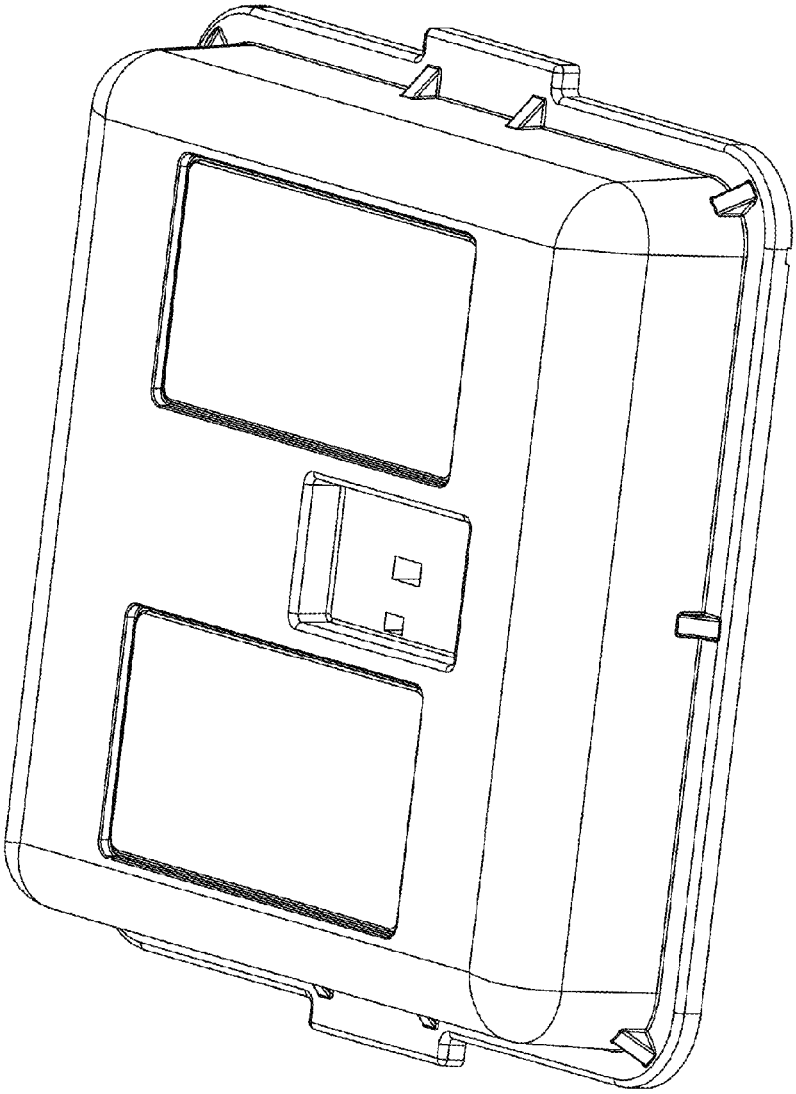
Figure 2:
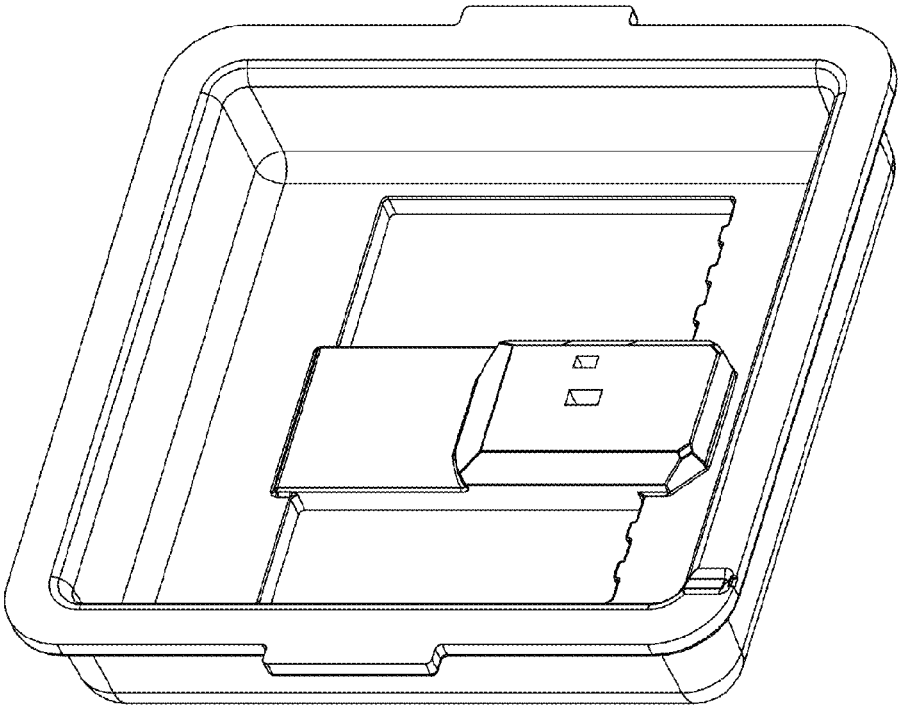
Figure 3:
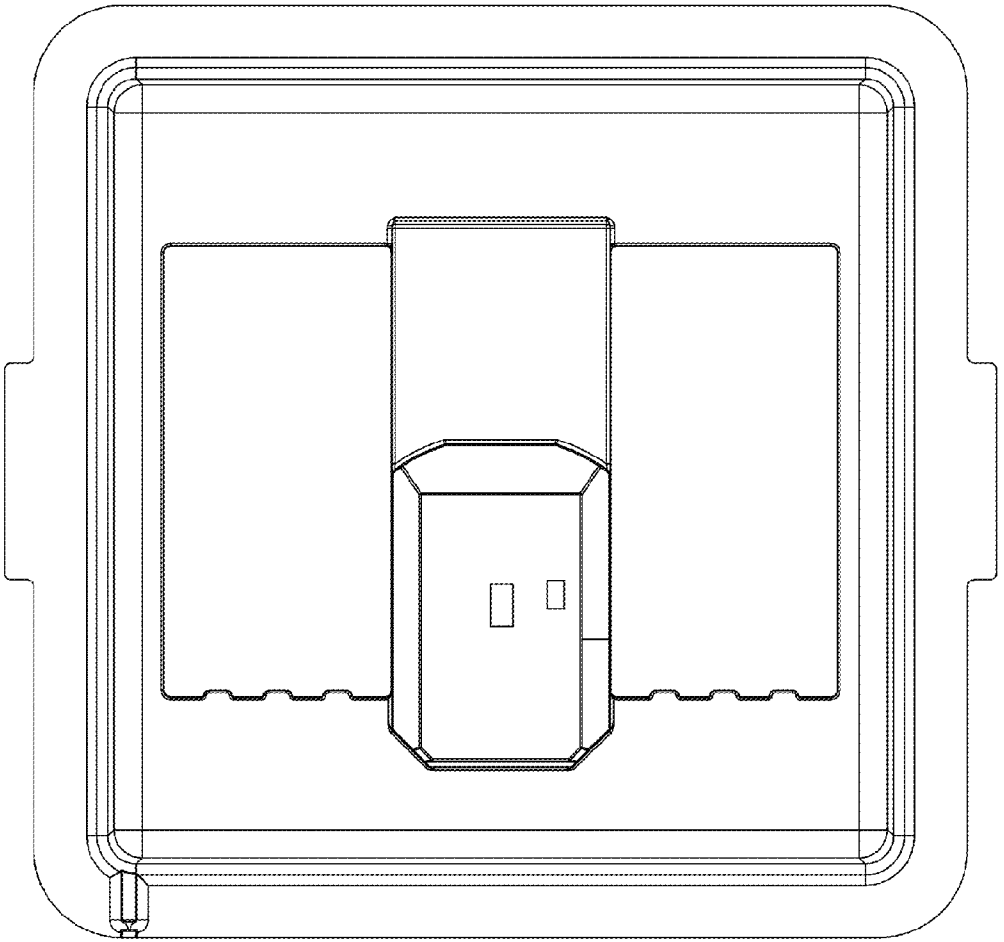
Figure 4:
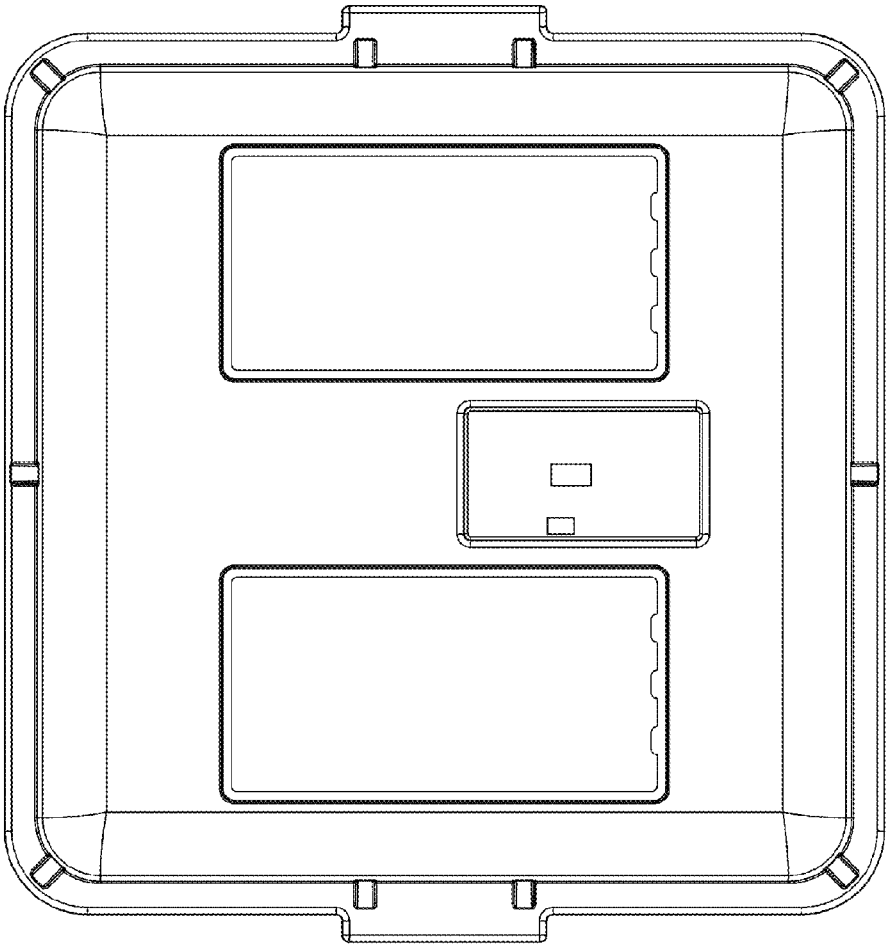
Figure 5:
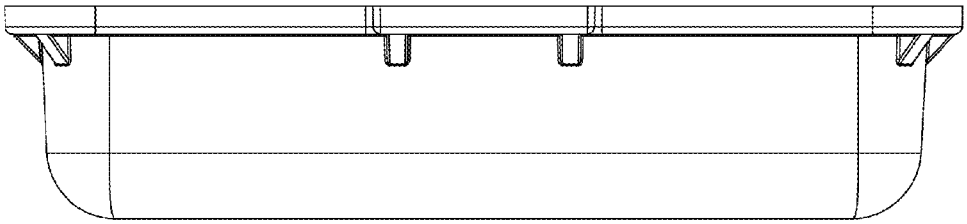
Figure 6:
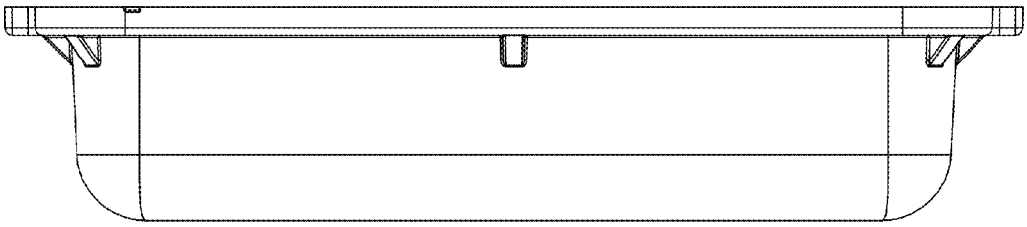
Figure 7:
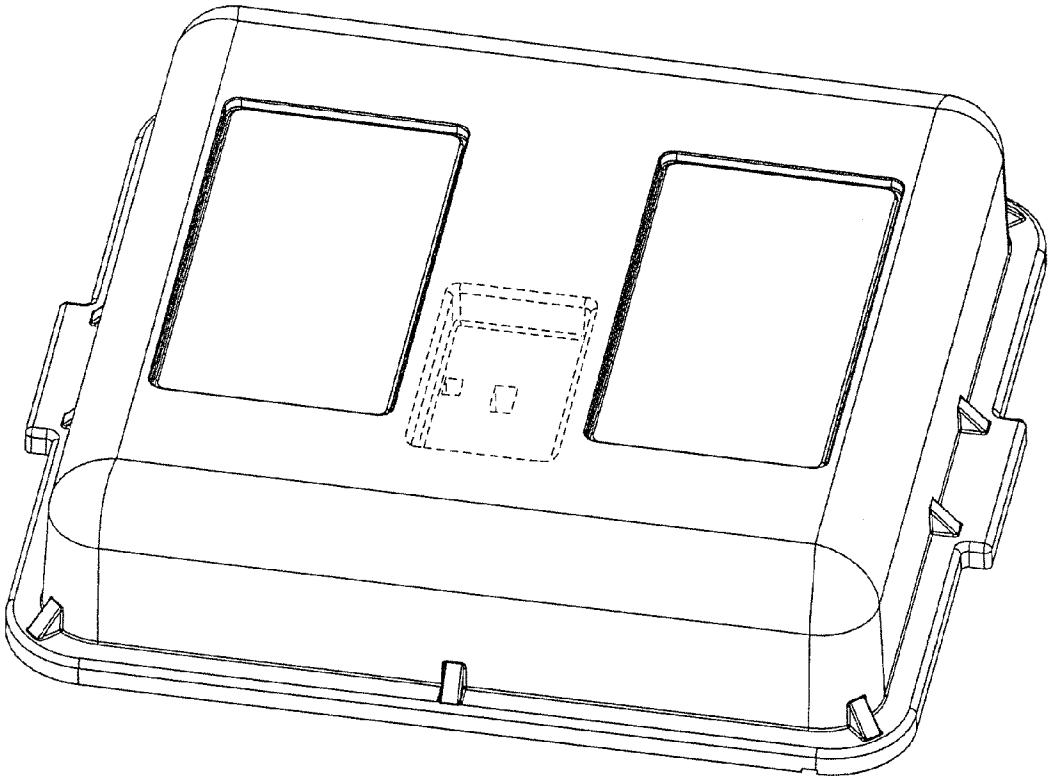
Figure 8:
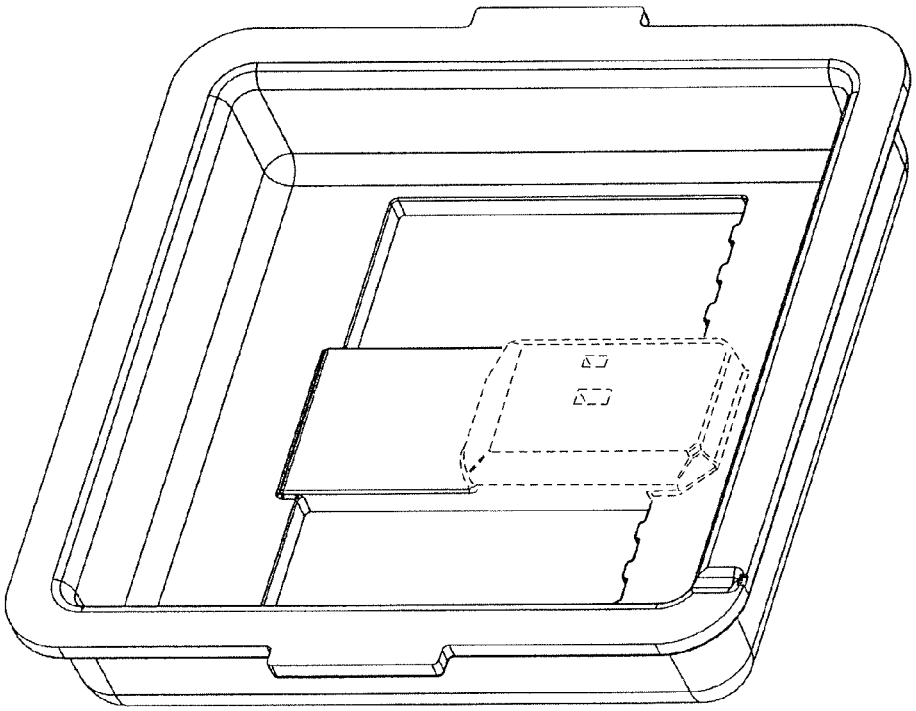
Figure 9:
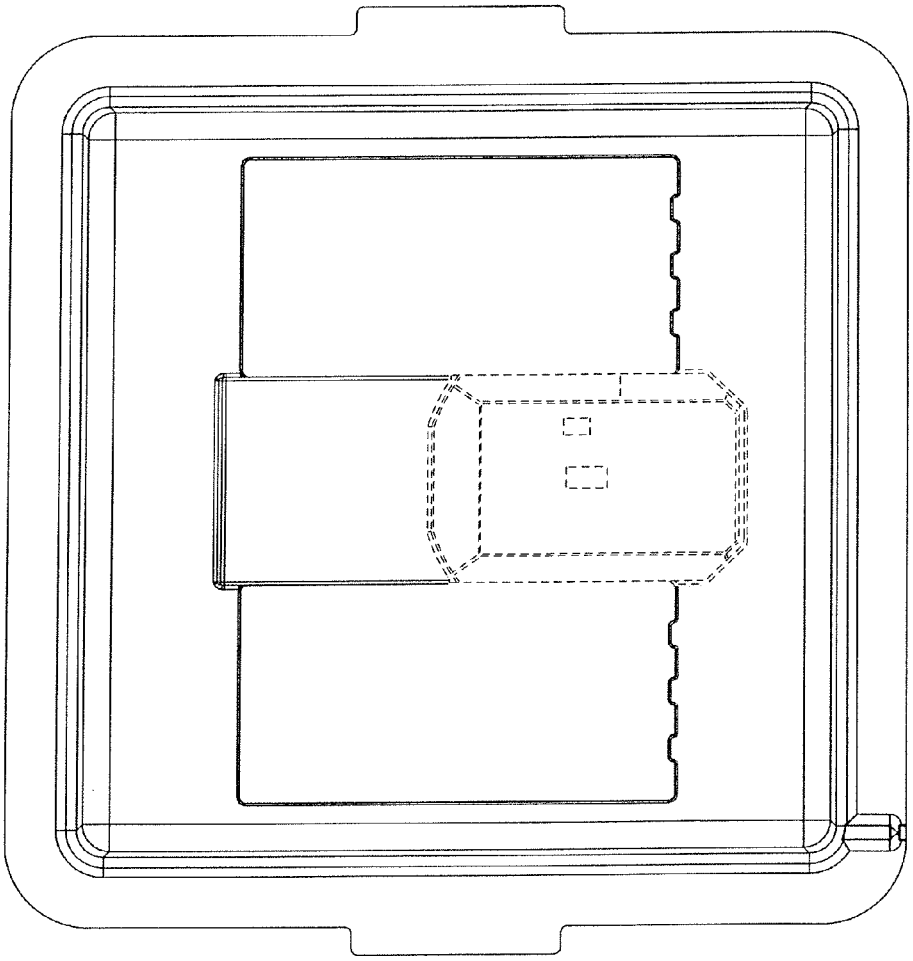
Figure 10:
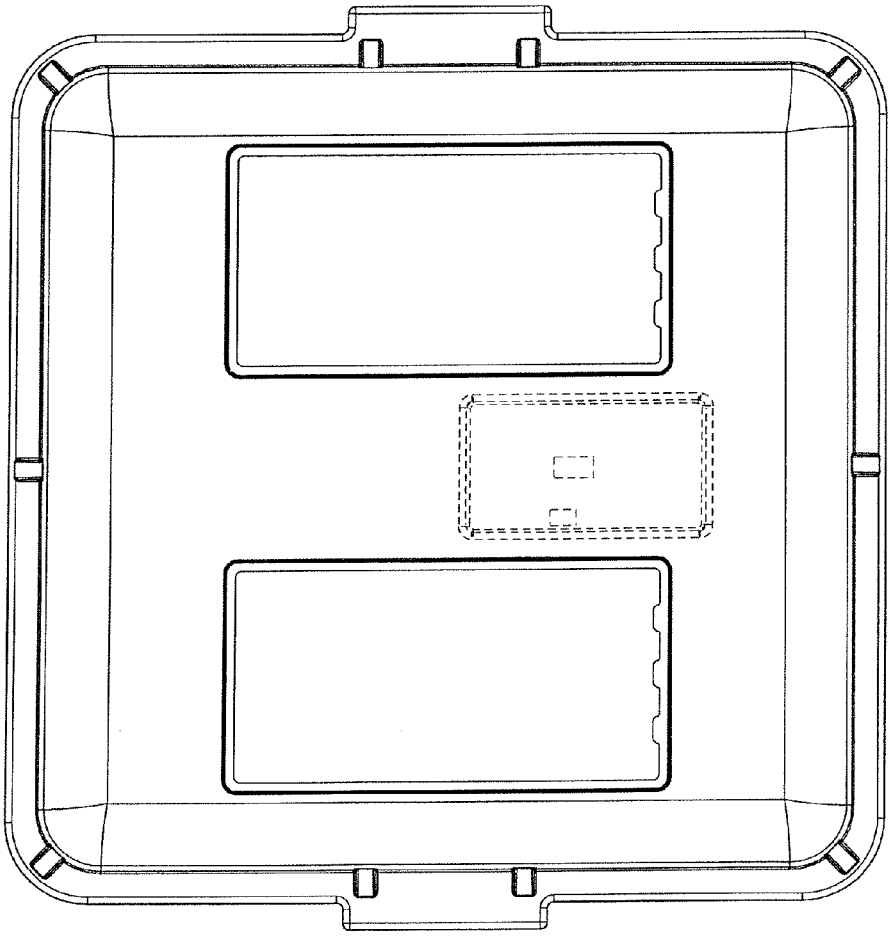
Figure 11:
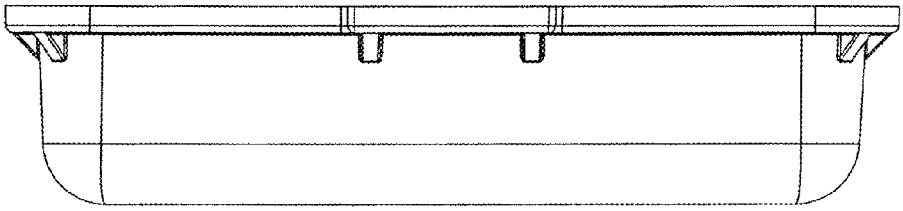
Figure 12:
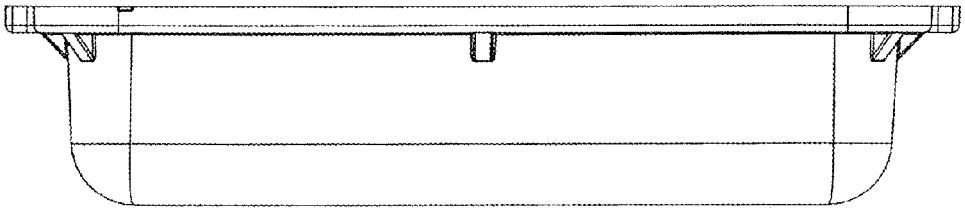

Matter enclosed in heavy brackets [ ] appears in the original patent but forms no part of this reissue; matter printed in italics indicates the additions made by reissue.

New

(56) References Cited

U.S. PATENT DOCUMENTS

| | | | | |
|---|---|---|---|---|
| 5,148,773 | A | 9/1992 | Ontiveros | |
| 5,385,529 | A | 1/1995 | Koch | |
| 5,410,985 | A | 5/1995 | Schritz | |
| 5,519,188 | A | 5/1996 | Yuichi et al. | |
| 5,525,512 | A | 6/1996 | Pieler et al. | |
| 5,568,791 | A | 10/1996 | Dratt | |
| 5,575,237 | A | 11/1996 | Ferguson | |
| 5,657,720 | A | 8/1997 | Walters | |
| 5,690,055 | A | 11/1997 | Wenstrand et al. | |
| 5,964,182 | A | 10/1999 | Cox et al. | |
| 5,984,002 | A | 11/1999 | Kido et al. | |
| 6,036,633 | A | 3/2000 | Hodge | |
| 6,196,159 | B1 | 3/2001 | Dratt | |
| 6,196,160 | B1 | 3/2001 | Pas | |
| 6,231,346 | B1 | 5/2001 | Sagi-Dolev | |
| 6,635,471 | B1 | 10/2003 | Lee et al. | |
| 6,711,937 | B2 | 3/2004 | Richards et al. | |
| 7,021,552 | B2 | 4/2006 | Meter | |
| 7,172,782 | B2 | 2/2007 | Howarth | |
| D557,864 | S * | 12/2007 | Den Boer | D30/108 |
| 7,404,375 | B2 | 7/2008 | Rajcic-Spasojevic | |
| 7,618,808 | B1 | 11/2009 | Papp | |
| 7,648,585 | B2 | 1/2010 | Meter | |
| 7,915,033 | B2 | 3/2011 | Higashi et al. | |
| D637,292 | S * | 5/2011 | Hudson | D24/163 |
| 7,950,350 | B2 | 5/2011 | Berckmans et al. | |
| 7,966,972 | B2 | 6/2011 | Meter | |
| 7,966,973 | B1 | 6/2011 | Adragna, Jr. et al. | |
| 8,012,419 | B2 | 9/2011 | Ammann et al. | |
| 8,025,552 | B2 | 9/2011 | Cohen et al. | |
| 8,069,819 | B2 | 12/2011 | Huisinga et al. | |
| 8,082,879 | B2 | 12/2011 | Moran | |
| 8,082,884 | B2 | 12/2011 | Sia | |
| 8,098,370 | B2 | 1/2012 | Hebrank et al. | |
| D655,870 | S * | 3/2012 | Carlin, Jr. | D30/117 |
| 8,137,620 | B2 | 3/2012 | Ammann et al. | |
| 8,192,983 | B2 | 6/2012 | Kiyota et al. | |
| 8,196,548 | B2 | 6/2012 | Hendel | |
| 8,272,352 | B2 | 9/2012 | Hendel | |
| 8,292,192 | B1 | 10/2012 | Purswell et al. | |
| 8,327,798 | B2 | 12/2012 | Lahav et al. | |
| 8,339,588 | B2 | 12/2012 | Foster | |
| 8,615,374 | B1 | 12/2013 | Discenzo | |

OTHER PUBLICATIONS

Miller Manufacturing Company, "Poultry & Game Bird," 2004-2005 Miller Manufacturing Company Catalog, Jul. 2004, p. 9.

*Miller Manufacturing Company* v. *Farm Innovators, Inc.*, Complaint filed by Miller Manufacturing Company, dated Sep. 2, 2014, pp. 1-5 and Exhs. A-C.

*Miller Manufacturing Company* v. *Farm Innovators, Inc.*, Plaintiff Miller Manufacturing Company's Motion to Stay, dated Oct. 10, 2014, pp. 1-2.

*Miller Manufacturing Company* v. *Farm Innovators, Inc.*, Declaration of Aaron A. Myers in Support of Farm Innovators' Opposition to Plaintiff's Motion to Stay, dated Oct. 17, 2014, pp. 1-2 and Exhs. A-F.

*Miller Manufacturing Company* v. *Farm Innovators, Inc.*, Memorandum in Support of Farm Innovators' Motion to Dismiss Without Prejudice, dated Oct. 27, 2014, pp. 1-4.

*Miller Manufacturing Company* v. *Farm Innovators, Inc.*, Declaration of Benjamin Clark in Support of Farm Innovators' Motion to Dismiss Without Prejudice, dated Oct. 27, 2014, pp. 1-4.

*Miller Manufacturing Company* v. *Farm Innovators, Inc.*, Declaration of Aaron A. Myers in Support of Farm Innovators' Motion to Dismiss Without Prejudice, dated Oct. 27, 2014, pp. 1-2 and Exhs. A-B.

*Miller Manufacturing Company* v. *Farm Innovators, Inc.*, Second Declaration of Benjamin Clark in Support of Farm Innovators' Motion to Dismiss Without Prejudice, dated Dec. 1, 2014, pp. 1-3 and Exh. 1.

Miller Manufacturing Company, "Your Complete Source for Poultry Products" Advertisement, Nov. 1999, 1 page.

"1583 Hova-Bator, Circulated Air Picture Window," Web page <http://www.gqfmfg.com/store/comersus_viewItem.asp?idProduct=76#>, 2 pages, Apr. 15, 2008, retrieved from Internet Archive Wayback Machine <https://web.archive.org/web/20080415204712/http://www.gqfmfg.com/store/comersus_viewItem.asp?idProduct=76#> on Feb. 17, 2015.

"G.Q.F. Manufacturing 1602N Hova-Bator Incubator," Web page <http://www.amazon.com/G-Q-F-Manufacturing-1602N-Hova-Bator-Incubator/dp/B0050I4H6A/ref=cm_cr_pr_pl_footer_top?ie=UTF8>, 7 pages, reviews dating from 2009, retrieved on Feb. 17, 2015.

"Fall Harvest Products Circulated Air Incubator #CA115," Web page <http://www.fallharvestproducts.com/item158.htm>, 3 pages, Nov. 28, 2012, retrieved from Internet Archive Wayback Machine <https://web.archive.org/web/20121128173424/http://www.fallharvestproducts.com/item158.htm> on Feb. 17, 2015).

"9105 Chick-Bator w/ 4 Quail Eggs 110v," Web page <http://www.gqfmfg.com/store/comersus_viewItem.asp?idProduct=273#>, 2 pages, Apr. 15, 2008, retrieved from the Internet Archive Wayback Machine <https://web.archive.org/web/20080415204111/http://www.gqfmfg.com/store/comersus_viewItem.asp?idProduct=273 #>on Feb. 17, 2015.

"Classroom Incubators and Brooders," Web page <http://www.brinsea.com/cat-Classroom_Incubators_and_Brooders-32.aspx>, 3 pages, Jan. 13, 2012, retrieved from Internet Archive Wayback Machine <https://web.archive.org/web/20120113215144/http://www.brinsea.com/cat-Classroom_Incubators_and_Brooders-32.aspx> on Feb. 17, 2015.

"Brinsea Octagon 20 ECO Manual Turn Egg Incubator," Web page <http://www.amazon.com/Brinsea-Octagon-20-ECO-Incubator/dp/B001UF8OSY/ref=sr_1_19?s=lawn-garden&ie=UTF8&qid=1424194709&sr=1-19&keywords=brinsea+incubator>, 10 pages, Amazon product availability date of Mar. 2, 2009, retrieved on Feb. 17, 2015.

"Incubator: Octagon 40 with Autoturn Cradle," Web page <http://www.amazon.com/Incubator-Octagon-40-Autoturn-Cradle/dp/B000KFY7RM/ref=sr_1_1?s=lawn-garden&ie=UTF8&qid=1424195526&sr=1-1&keywords=octagon+40>, 7 pages, Amazon product availability date of Nov. 8, 2006, retrieved on Feb. 17, 2015.

"Reptibator," Web page <http://www.zoomed.com/db/products/EntryDetail.php?EntryID=315&DatabaseID=2&SearchID=1>, 2 pages, Jun. 15, 2011, retrieved from Internet Archive Wayback Machine <https://web.archive.org/web/20110615144057/http://www.zoomed.com/db/products/EntryDetail.php?EntryID=315&DatabaseID=2&SearchID=1> on Feb. 17, 2015.

"Juragon RX Reptile Egg Incubator," Web page <http://www.amazon.co.uk/Juragon-RX-Reptile-Egg-Incubator/dp/B007YLF81Y>, 5 pages, Amazon.co.uk product availability date of Mar. 26, 2013, retrieved on Feb. 17, 2015.

"RCOM 20 Pro Egg Incubator," Web page <http://www.amazon.co.uk/RCOM-20-Pro-Egg-Incubator/dp/B007YJYMD6/ref=pd_sim_sbs_ce_14?ie=UTF8&refRID=1XDWFZF59BBNX34FDNVN>, 5 pages, Amazon.co.uk product availability date of Jul. 2012, retrieved on Feb. 17, 2015.

"Incubator Full Automatic Incubator with User Manual Chicken Eggs," Web page <http://www.amazon.co.uk/Incubator-automatic-incubator-manual-chicken/dp/B00LXNDXLG/ref=sr_1_45?ie=UTF8&qid=1424208028&sr=8-45&keywords=48+egg+incubator>, 5 pages, Amazon.co.uk product availability date of Apr. 16, 2010, retrieved on Feb. 17, 2015.

Photographs of Miller Manufacturing Company Still Air Incubator, Model 5200, product released in 1985.

Photographs of Miller Manufacturing Company Still Air Incubator, Model 9200, product released in 1995.

Photographs of Miller Manufacturing Company Circulated Air Incubator with Forced Air Fan Kit, Model 10200, product released in 1995.

Photographs of Farm Innovators, Inc. Still Air Incubator, Model 2100, Product Released by 2012.

Photographs of Farm Innovators, Inc. Circulated Air Incubator, Model 2200, Product Released by 2012.

(56) References Cited

OTHER PUBLICATIONS

Photographs of Farm Innovators, Inc. Circulated Air Incubator, Model 4200, Product Released by 2012.
Miller Manufacturing Company, "Incubator & Accessory Instruction Manual," instruction manual for Little Giant products, including incubators released in 1995, 2 pages.
Farm Innovators, Inc., instructions manual for products including Model 2100 Still Air Incubator, Jun. 2012, 2 pages.
GQF Mfg. Co., 2362N Circulated Air Hova-Bator, copyright 2009, 1 page.
GQF Mfg. Co., 1602N Thermal Air Hova-Bator, copyright 2009, 1 page.
GQF Mfg. Co., Hova-Bator, copyright 2009, 1 page.

* cited by examiner

New

New

New

New

New